Jan. 5, 1960 W. C. WINTRODE 2,920,264
SATURABLE TRANSFORMER MIXING AND AMPLIFYING DEVICE
Filed Sept. 10, 1954
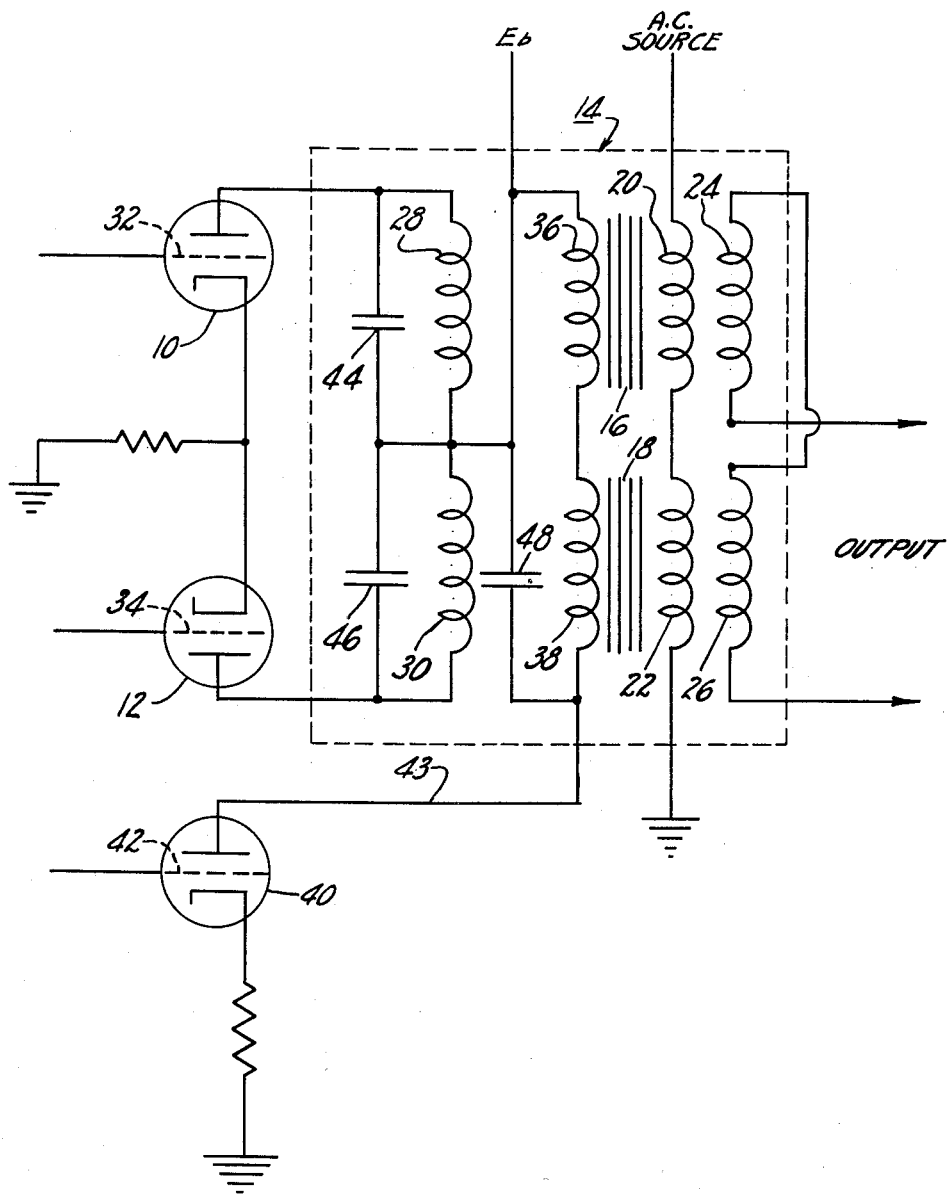
INVENTOR.
WARNER C. WINTRODE
BY
*Robert C. Smith*
ATTORNEY

United States Patent Office 2,920,264
Patented Jan. 5, 1960

2,920,264

SATURABLE TRANSFORMER MIXING AND AMPLIFYING DEVICE

Warner C. Wintrode, South Bend, Ind., assignor to Bendix Aviation Corporation, South Bend, Ind., a corporation of Delaware Application September 10, 1954, Serial No. 455,317

4 Claims. (Cl. 323—56)

This invention relates to magnetic amplifiers and more particularly to an amplifier having a plurality of direct current windings for the introduction of a plurality of control parameters.

Wherever electrical systems are used in airborne equipment it becomes desirable to provide the utmost in reliability coupled with the smallest physical size and weight consistent with said reliability. The present invention has been used in a gas turbine fuel control system as a combined mixer and output stage, it being capable of providing the functions of combining various control parameters plus power amplification of the resulting control signal sufficient to drive a valve motor. For this particular application it replaces what otherwise would be two or more large output vacuum tubes having considerable power dissipation, plus other circuitry necessary to provide the required mixing function. It will be appreciated that while this invention is discussed herein in connection with a gas turbine fuel control system, it is applicable to a variety of uses which will occur to those skilled in the art. It is, therefore, an object of the present invention to provide an output stage for an electrical control system which has a high degree of reliability and resistance to shock.

It is another object to provide an output stage for an electrical control system having low power dissipation.

It is a further object to provide an output stage for an electrical control system capable of combining signals representative of various control parameters and amplifying the resultant signal to a level capable of doing an appreciable amount of useful work, such as driving a valve.

It is a further object to provide an output stage capable of fulfilling the above objects and which is small in physical size and of reasonable weight.

Other objects and advantages will become apparent from the following description taken in connection with the accompanying drawings.

The single figure is a schematic drawing of my magnetic amplifier system in its simplest form.

Referring to the drawing, a pair of vacuum tubes 10 and 12 constitute a parallel phase-sensitive driving circuit for the magnetic amplifier, shown generally at numeral 14. The amplifier 14 consists of two cores 16 and 18 upon which are wound identical alternating current windings 20 and 22, respectively. These windings are connected in series directly between an alternating current source and ground so that if the source is, for example, 400 cycle, 115 volts as is commonly used in airborne equipment, the voltage drop across windings 20 and 22 will be the same and under any conditions must equal 115 volts. When the current is flowing only in windings 20 and 22 the cores 16 and 18 are only partially saturated and will have substantially the same flux density. Also wound on cores 16 and 18 are output or secondary windings 24 and 26. The voltage induced in winding 24 is responsive to changes in the flux density of core 16 and the voltage induced in winding 26 is responsive to changes in the flux density of core 18. If each core has the same flux density, the voltage induced across each of windings 24 and 26 will be the same. It will be observed, however, that these windings are connected in series bucking relationship so that if the voltage induced across each is the same, the voltages will cancel and the output is zero.

Also wound on cores 16 and 18 are direct current control windings 28 and 30 which are in the anode circuits of tubes 10 and 12 respectively. The grids 32 and 34, of these tubes, are supplied with a signal representative of an error value of a particular control parameter such as speed. The parallel system is phase-sensitive in such manner that currents are conducted only when the grid voltages are in phase with anode voltages of tubes 10 and 12. In a specific application, if an over-speed condition exists, only the signal of grid 34 will be in phase with the anode voltage and therefore current will flow only in the control winding 30. Should an under-speed condition prevail only the signal on grid 32 will be in phase with the anode voltage and current will flow only in control winding 28. At the speed point currents in both tubes 10 and 12 are at a very low value and are equal for all practical purposes.

Now consider the situation outlined above when the signal on the grid 32 of tube 10 is such as to cause a current to flow in winding 28. This current will cause core 16 to become more nearly saturated, thus reducing the voltage drop across winding 20 and causing a corresponding increase in the voltage drop across winding 22. This change causes a lower voltage across output winding 24 and a higher voltage across winding 26 and, inasmuch as the polarity and magnitude of the output voltage is dictated by the difference between the voltages in these windings, the output will be of the same polarity as the voltage in winding 26 and of a magnitude equal to the difference between the voltages induced in windings 24 and 26. Were conduction in tube 12 rather than in tube 10, the polarity of the output would be the same as that in winding 24.

A second pair of control windings 36 and 38 are wound on cores 16 and 18, respectively, for the purpose of introducing a second control parameter. A signal proportional to an error value of a second control function, which will be considered to be temperature, may be introduced into tube 40 by means of grid 42. This tube is connected by means of a wire 43 to the same anode voltage source as are tubes 10 and 12 and will conduct a signal to windings 36 and 38 only when the signal on grid 42 is in phase with the anode voltage. The temperature function is not arranged in a parallel circuit controlling to a reference value as is the case with the speed signal but simply provides a limiting signal which is capable of overriding the speed signal should temperature become excessive. It will be observed that windings 36 and 38 are connected so that on core 16 the control windings 28 and 36 produce ampere turns in a bucking direction, while on core 18, the windings 30 and 38 produce ampere turns in an aiding direction. In this manner, any current flowing through windings 36 and 38 will tend to saturate core 18 while reducing the flux density in core 16 thereby reducing the voltage drop across winding 22 and increasing the drop across winding 20. The resulting output voltage has the same phase relationship as the current in output winding 24. The capacitors 44 and 46 which are connected across windings 28 and 30 and capacitor 48 which is connected across windings 36 and 38 serve as filters, assuring that current will flow through substantially an entire cycle in the windings despite the fact that the tubes may conduct during only part of the cycle. In a fuel system the arrangement described above would properly be connected to a valve motor in such a manner as to cause a reduction in fuel flow.

It is recognized that limits on additional control parameters may be introduced in exactly the same manner as outlined above by the simple expedient of adding more direct current control windings with an approximate signal source connected in the same manner as are windings 36 and 38. Another very straightforward manner of introducing an additional limiting function would be by connecting another signal source like that supplied by tube 40 to windings 36 and 38, perhaps even connecting said source directly to wire 43. Other modifications may be made without departing from the scope of the invention and while the invention has been described herein in connection with a speed and temperature control for a fuel system, it will be found useful in many applications where a small but extremely rugged means for mixing and amplifying signals representative of two or more control parameters is required.

I claim:

1. In a magnetic amplifier having a first core with an alternating current power winding, an output winding and a control winding inductively associated therewith, and a second core having an alternating current power winding, an output winding and a control winding inductively associated therewith: means for introducing an overriding signal into said magnetic amplifier comprising a second control winding on said first core and a second control winding on said second core, said second control windings being connected in series with each other in such manner as to cause the control windings associated with said first core to carry current tending to aid each other in the production of magnetic flux and the control windings associated with said second core to carry current tending to oppose each other in the production of magnetic flux.

2. In a magnetic amplifier having two core members; an alternating current power winding on each core, said windings being connected in series; an output winding on each core, said output windings being connected in series bucking arrangement; and first and second direct current signal windings on said cores, said signal windings being connected to first and second direct current signal sources: third and fourth direct current signal windings on said cores connected in series with a third direct current signal source in such manner that the magnetic flux produced by one of said windings tends to aid the magnetic flux produced by said first signal winding in one core and the magnetic flux produced by the other of said windings tends to oppose the flux produced by said second signal winding in said second core such that the output of said amplifier will always be controlled by said third signal source when said source is conducting current.

3. In a magnetic amplifier output stage for a control system: a first core having an alternating current power winding, an output winding, and a control winding inductively associated therewith; a second core having an alternating current power winding, an output winding and a control winding inductively associated therewith; said control windings being connected to a control circuit in such manner that one of said control windings will be energized upon the occurrence of a signal responsive to a first condition and the other of said windings will be energized upon the occurrence of a signal responsive to a second condition; and a second pair of control windings inductively associated with said cores connected to a control circuit which produces an output signal capable of overriding one of said signals only upon the occurrence of a third condition, said second control windings being connected in such manner that the control windings on one core aid each other in the production of magnetic flux and the control windings on the other core oppose each other in the production of magnetic flux.

4. In a magnetic amplifier output stage for a system for controlling a variable by holding a first parameter to a desired value and the second parameter within a limiting value: a first core having an alternating current power winding, an output winding and a control winding inductively associated therewith; a second core having an alternating current power winding, an output winding and a control winding inductively associated therewith; said control windings being connected to a control circuit in such manner that one of said control windings will be energized upon the occurrence of a signal representative of a value of said first parameter in excess of said desired value and the other of said control windings will be energized upon the occurrence of a signal representative of a value of said first parameter below said desired value; and a second pair of control windings inductively associated with said cores connected to a control circuit which produces an output signal capable of overriding one of said signals only upon the occurrence of a signal representative of a value of said second parameter beyond said limiting value, said second pair of control windings being connected in such manner that the control windings on one core aid each other in the production of magnetic flux and the control windings on the other core oppose each other in the production of magnetic flux.

References Cited in the file of this patent

UNITED STATES PATENTS

| 2,053,154 | La Pierre | Sept. 1, 1936 |
| 2,519,339 | Avery | Aug. 22, 1950 |
| 2,559,513 | Palmer | July 3, 1951 |
| 2,631,268 | Ransom et al. | Mar. 10, 1953 |
| 2,698,411 | Jarvis | Dec. 28, 1954 |
| 2,775,712 | MacCallum et al. | Dec. 25, 1956 |
| 2,854,620 | Steinitz | Sept. 30, 1958 |